United States Patent [19]
Hopkins et al.

[11] Patent Number: 5,331,393
[45] Date of Patent: Jul. 19, 1994

[54] METHOD AND APPARATUS FOR LOCATING A SPECIFIC LOCATION ON A VEHICLE HEADLAMP

[75] Inventors: Evan L. Hopkins, Emporia; John J. Humbard, Pittsburg; Michael G. Busby, Emporia, all of Kans.

[73] Assignee: Hopkins Manufacturing Corporation, Emporia, Kans.

[21] Appl. No.: 989,123

[22] Filed: Dec. 11, 1992

[51] Int. Cl.5 .............................................. G01J 1/00
[52] U.S. Cl. .................................................. 356/121
[58] Field of Search ....................... 356/121, 218, 226; 250/239, 203.1, 203.4

[56] References Cited

U.S. PATENT DOCUMENTS

| | | |
|---|---|---|
| 2,162,010 | 6/1939 | Graham . |
| 3,077,139 | 2/1963 | Todd et al. . |
| 3,386,333 | 6/1968 | Preston . |
| 3,467,473 | 9/1969 | Preston ................................ 356/121 |
| 3,515,483 | 6/1970 | Irwin ................................... 356/121 |
| 3,532,432 | 10/1970 | Mansour ............................ 356/121 |
| 3,709,609 | 1/1973 | Spengler et al. ................. 356/152 |
| 3,746,449 | 7/1973 | Schick ................................ 356/121 |
| 3,791,740 | 2/1974 | Proefrock .......................... 356/121 |
| 3,857,639 | 12/1974 | Mason ................................ 250/239 |
| 3,946,224 | 3/1976 | Allera et al. ...................... 250/239 |
| 4,120,589 | 10/1978 | Mima et al. ....................... 356/121 |
| 4,182,956 | 1/1980 | Funk, Jr. et al. ................. 250/239 |
| 4,185,298 | 1/1980 | Billet et al. ....................... 358/106 |
| 4,435,078 | 3/1984 | de Brabander et al. ......... 356/121 |
| 4,609,939 | 9/1986 | Kozawa et al. .................. 356/121 |
| 4,647,195 | 3/1987 | Ishikawa et al. ................. 356/121 |
| 4,679,935 | 7/1987 | Fukuda et al. ................... 356/121 |
| 4,730,923 | 3/1988 | Kosugi et al. .................... 356/121 |
| 4,744,655 | 5/1988 | Sdika ................................. 356/121 |
| 4,948,249 | 8/1990 | Hopkins et al. .................. 356/121 |
| 4,973,155 | 11/1990 | Masuda ............................. 356/121 |
| 5,078,490 | 1/1992 | Oldweiler et al. ............... 356/121 |
| 5,164,785 | 11/1992 | Hopkins et al. .................. 356/121 |

FOREIGN PATENT DOCUMENTS 57-59125 4/1982 Japan .................................. 356/121
57-116235 7/1982 Japan .................................. 356/121

Primary Examiner—F. L. Evans
Attorney, Agent, or Firm—Hovey, Williams, Timmons & Collins

[57] ABSTRACT

A method and apparatus for locating the edge of a headlamp and for centering a headlight aiming device with respect to a particular location on the headlamp includes an elongated hollow tube having first and second ends, the first end of which has an entrance opening designed to have light from the headlamp incident thereon. The entrance opening of the tube and the length of the tube provide an appropriate field of view such that the light incident upon the entrance opening of the tube travels down the tube and is incident upon a light detection device located at the far end of the tube. The light detection device is connected to signal amplifying circuitry which provides a digitally coded output signal indicative of the intensity of the light from the headlamp. The tube is moved vertically and horizontally from positions outside of the headlamp beam pattern to locations within the headlamp beam pattern and across the plane of the headlamp edge. From the light intensity measurements, the edges of the headlamp can be determined. Once the edges of the headlamp are determined, a particular location on the headlamp, e.g., the centerpoint, can be determined by using e.g., appropriate manufacturer's specifications for the headlamp. The aiming device can then be properly located with respect to the particular location on the headlamp such that aiming of the headlamp can then be performed.

20 Claims, 3 Drawing Sheets

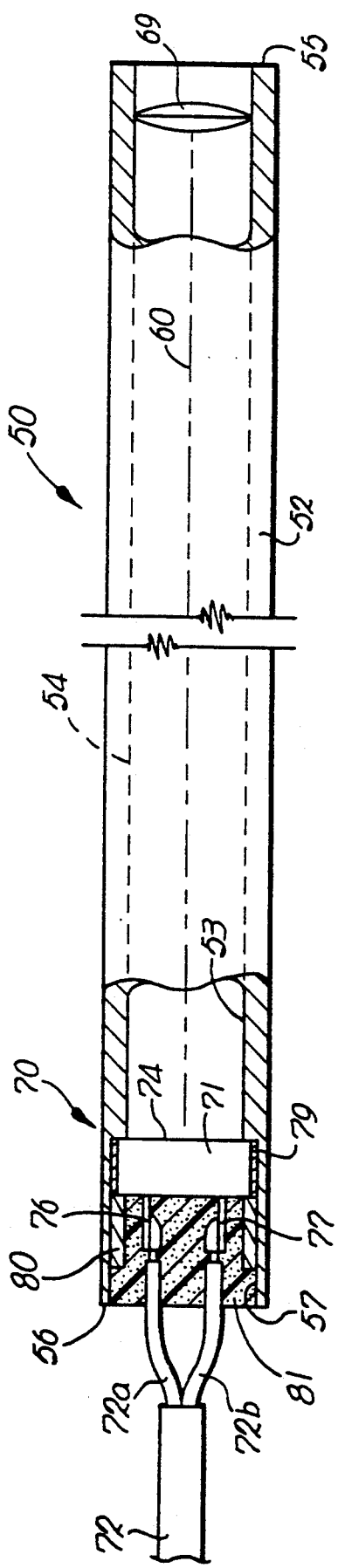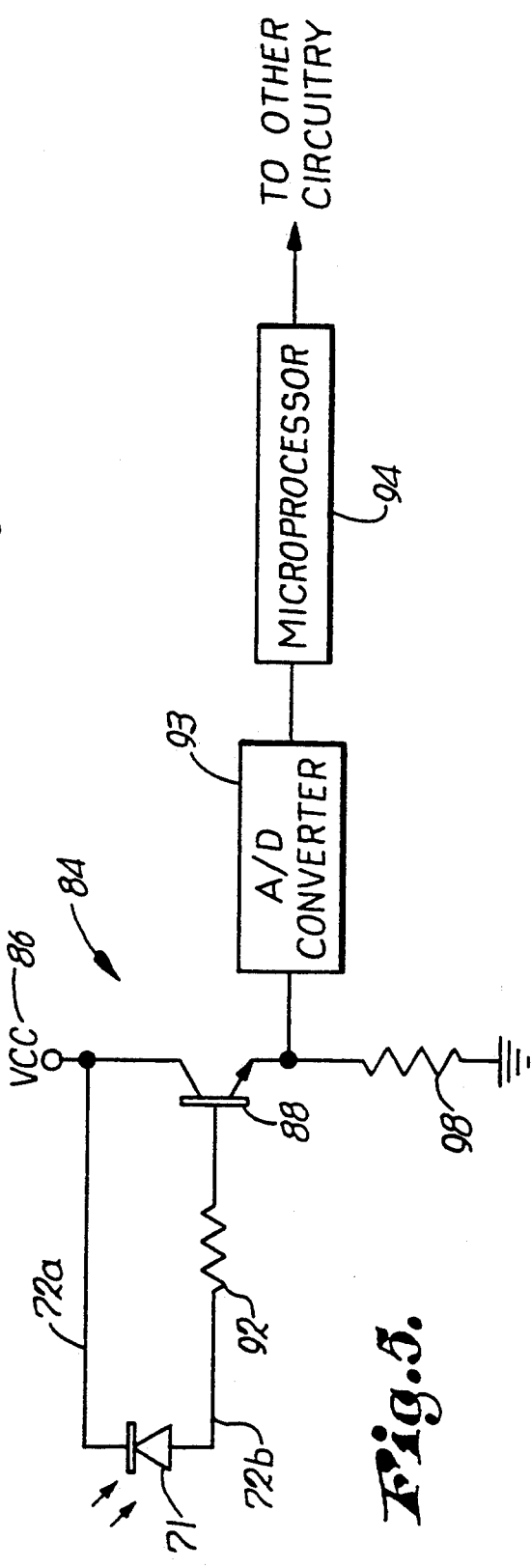
Fig. 4.
Fig. 5.

METHOD AND APPARATUS FOR LOCATING A SPECIFIC LOCATION ON A VEHICLE HEADLAMP

FIELD OF THE INVENTION

The present invention relates to a method and apparatus for aiming the headlamp of a vehicle, and in particular relates to a method and apparatus for initially determining a specific location on the headlamp, such as a centerpoint, for properly aligning an aiming device in front of the headlamp.

BACKGROUND

Vehicle headlamps are designed to project high intensity beams of light in prescribed patterns to illuminate certain portions of the road in front of the vehicle. Generally, vehicles are equipped with a first pair of headlamps, referred to as the "high beams", to illuminate the highway generally in front of the vehicle, and a second pair of headlamps, referred to as "low beams" which are directed downwardly in front of the vehicle and slightly to the right so as not to blind oncoming motorists.

In order to produce a desired illumination that maximizes visibility at night without producing excessive glare for oncoming motorists, the headlamps must be properly aimed and produce a particular light pattern. Standards for headlamp aiming and illumination patterns are prescribes by industrial groups, such as the Society of Automotive Engineers (SAE), and by governmental agencies. In general, different aiming and illumination pattern standards have been prescribed for different geographical areas, such as North America and Europe.

Various methods and apparatus for determining proper vehicle headlamp aim during vehicle manufacture, and after vehicle has been in use, are known. In general, these methods sense the light intensity across the headlamp light beam, compare the light intensity to prescribed standards, and provide an output which can be used to accurately adjust the headlamp.

One type of early method for aiming a vehicle headlamp is referred to as "hot spot" aiming, wherein location of the hot spot of the intensity pattern is compared with appropriate specifications to determine if the headlamp is properly aimed. A more recent approach to headlamp aiming, which was developed by the assignee of the present invention, is referred to as the "fractional balance" method, wherein relative intensities of different portions of the light beam are compared. Further, an even more recent method developed by the assignee of the present invention is referred to as "pattern framing" wherein a row and column of pixels having prescribed light intensities relative to the hot spot are determined, and the intersection of the row and column is compared with appropriate specifications to determine the accuracy of the aim. These methods are disclosed in detail in Irwin, U.S. Pat. No. 3,515,483; Hopkins, U.S. Pat. No. 4,948,249; and in co-pending application Ser. No. 07/964,599, filed Oct. 21, 1992, for "Headlamp Aiming Method Using Pattern Framing", respectively, all of which are owned by the assignee of the present invention.

Vehicle manufacturers typically provide standards for vehicles on the assembly line so that headlamp aiming can be accomplished relatively accurately and rapidly within the manufacturing facility. For example, the manufacturers provide specifications indicating the supposed distance from the floor of the manufacturing plant or facility to the center of the headlamp. When the headlamp is to be aimed, a headlamp aiming device is positioned generally in front of the vehicle at the particular manufacturer's suggested height, and an appropriate aiming method is used. Properly positioning the headlamp aiming device in front of the vehicle is important because a poorly positioned headlamp aiming device can result in incorrect aiming of the headlamp.

However, as should be apparent, various factors can influence the height of the vehicle in the manufacturing facility, and therefore inadvertently change the height of the vehicle headlamp with respect to the floor surface. Such deviations can materially affect the quality of the aiming process and provide an incorrectly aimed headlamp. For example, the tires of the vehicle could be over or under-inflated, customizing or modifications of the vehicle could add extra weight to the vehicle and therefore lower the height of a vehicle, or different types of headlamps could be periodically substituted without appropriate corrections being made to the height of the headlight aiming device. Accordingly, such factors could influence the actual level of the vehicle headlamp above the floor of the manufacturing facility, and therefore affect the quality of the aim. Moreover, the manufacturer-provided specifications can be ineffective for accurately positioning the headlamp aiming device at locations remote from the manufacturing facility, such as at a service station or repair facility.

To facilitate positioning the headlamp aiming device correctly in front of the automobile in the manufacturing facility, or in a remote field location, such that the headlamp can be properly aimed using an appropriate aiming method, certain centering devices have been developed. These centering devices position the headlight aiming device centrally in front of the headlamp to some degree of accuracy. These devices can be used in conjunction with the manufacturer's specifications to confirm the location of the headlamp above the surface of the floor, or can be used independently in a remote location such as a service station or repair facility.

For example, Irwin '483 uses a retractable arm connected to the aiming device for generally positioning the lens in the device centrally in front of the headlamp.

A similar device is shown in co-pending application No. 07/964,599, for "Headlamp Aiming Method Using Pattern Framing". According to this invention, a mechanical probe is used for initially orienting a lens or focusing aperture relative to the headlamp. The probe is pivotally connected to the housing of the lens or aperture and can be moved away from the lens or aperture after orientation of the headlamp.

Finally, Hopkins '249 shows four discrete light intensity sensors (e.g., photovoltaic cells or photoconductors) disposed around the periphery of the lens for centering the headlamp relative to the lens. The light intensity sensors provide an output corresponding to the light intensity at each sensor. The relative positions of the headlamp and lens may be adjusted so that the relative amounts of light captured by each sensor, as indicated by its electrical response, are balanced according to a centering standard.

While the above-described devices provide a certain amount of accuracy and consistency in centering the aiming device in front of the headlamp, there is a demand for an improved centering means for centering the headlamp relative to the lens (or aperture) in the aiming device so that accurate aiming of the headlamp can be accomplished.

SUMMARY

The present invention provides a novel and unique method and apparatus for centering an aiming device relative to the headlamp of a vehicle. The method and apparatus are easy to use, are relatively inexpensive to manufacture, and enable the headlamp to be centered accurately and consistently for a subsequent aiming process.

The apparatus for centering the headlamp includes a light detection device preferably comprising an elongated hollow tube mounted to the bottom of the aiming device. The central axis of the tube is oriented substantially perpendicular to the plane of the headlamp lens. The hollow tube has a first and second end, with the first end of the tube having an entrance opening with a lens for focusing the headlamp light beam travelling therethrough.

A light detector (e.g., a photodiode or photovoltaic cell) is located at the second, far end of the tube and is designed to receive and detect light traveling through the entrance opening of the tube. Signal amplifying circuitry is connected to the light detector for providing an amplified output voltage signal which is indicative of the intensity of light in the tube.

As the light detection device is moved through the light beam across an edge of the headlamp, for example vertically across the top edge of the tube, the intensity of the light beam rapidly changes. The rate of change of the voltage signal from the light detector with respect to position increases as the light detection device approaches the headlamp edge, then levels off just after passing through the headlamp edge plane. The focusing lens in front of the light detector enhances the rate of voltage versus position change. Computation means receives the output from the signal amplifying circuitry and determines the location of the edge of the headlamp from the change in the light intensity. The tube is then moved horizontally using the same technique to determine the location of a side edge of the headlamp.

The hollow tube of the light detection device has a length and an inner diameter such that the light incident upon the light detector at the end of the tube provides an accurate indication of the light intensity at that point on the headlamp. The length and inner diameter of the tube is chosen to provide a field of view sufficient to result in a voltage versus position change that can be used to determine headlamp position within an acceptable tolerance. The same effect, i.e., control of the field of view, can also be accomplished by using a pin hole opening in front of a photodiode or other light detector mounted in a similar fashion.

From this edge location information, the computation means can determine the center of the headlamp, or other specific location on the headlamp, from known specifications provided by the headlamp manufacturer, or by computing the midpoint between the top and bottom edges, and between the side edges. Manual or automatic adjustment of the headlamp aiming device using, e.g., servo-motors, can then be provided if necessary to accurately position the headlamp aiming device in front of the headlamp.

Accordingly, it is one object of the present invention to provide an accurate and consistent method and apparatus for determining a particular point on a headlamp such that a headlamp aiming device can be properly located with respect to the headlamp for a subsequent headlamp aiming process.

It is another object of the present invention to provide a method and apparatus which is simple to use, relatively low-cost to manufacture, and which can be easily incorporated into a headlamp aiming system for automatically adjusting the location of a headlight aiming device with respect to the headlamp on the vehicle.

It is another object of the present invention to provide a method and apparatus for centering an aiming device with respect to a headlamp which can be used in either a manufacturing facility or a remote location, and regardless of the height of the vehicle from the ground.

Further objects of the present invention will become apparent from the following detailed description and the accompanying drawings.

DETAILED DESCRIPTION OF THE DRAWINGS

FIG. 4 is an enlarged side view, partially in section, of the light detection device according to the present invention; and FIG. 5 is a schematic illustration of the electrical circuit for the present invention.

DETAILED DESCRIPTION OF THE PREFERRED EMBODIMENT

Figure 1:
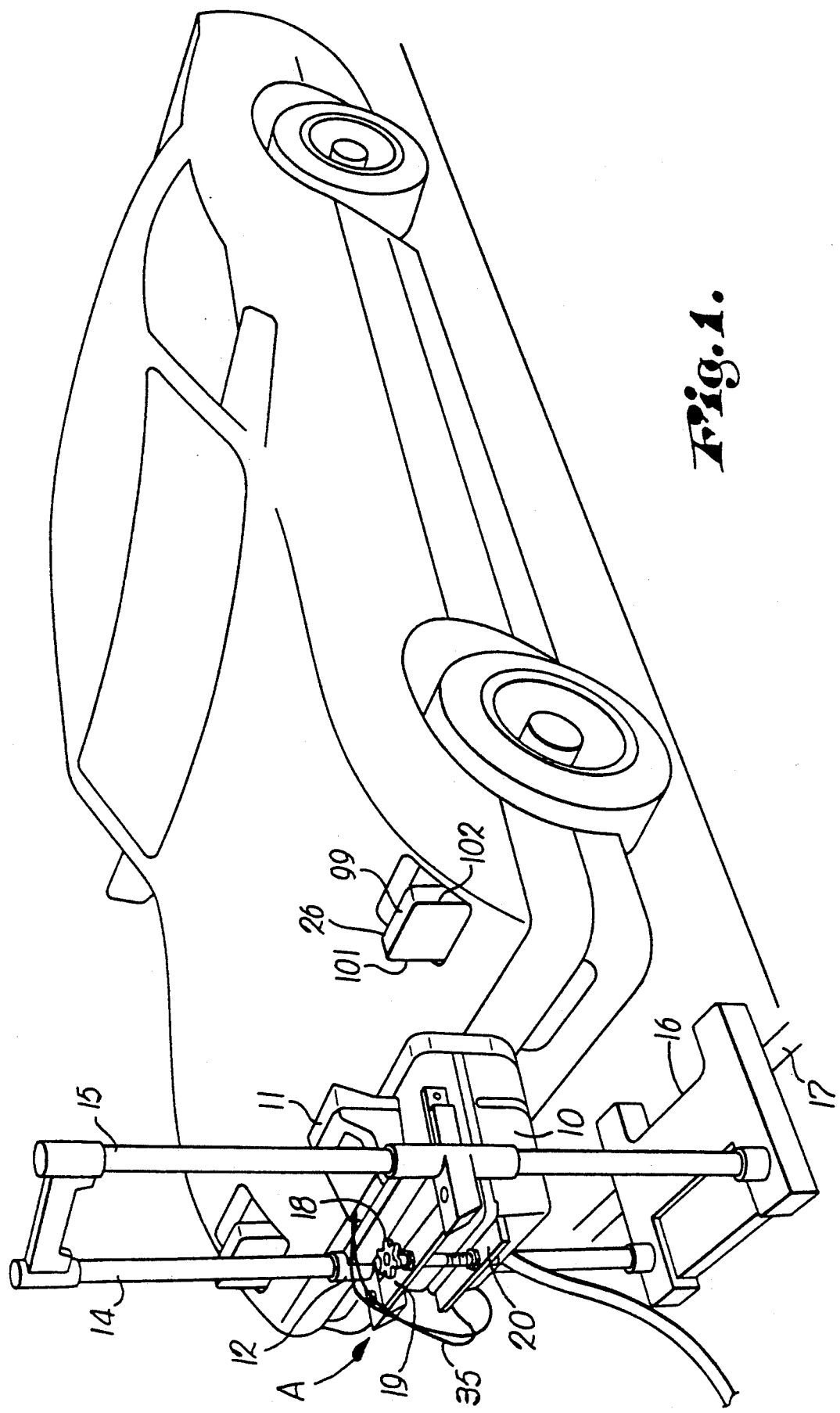
FIG. 1 is a perspective view of an apparatus according to the present invention.
Figure 2:
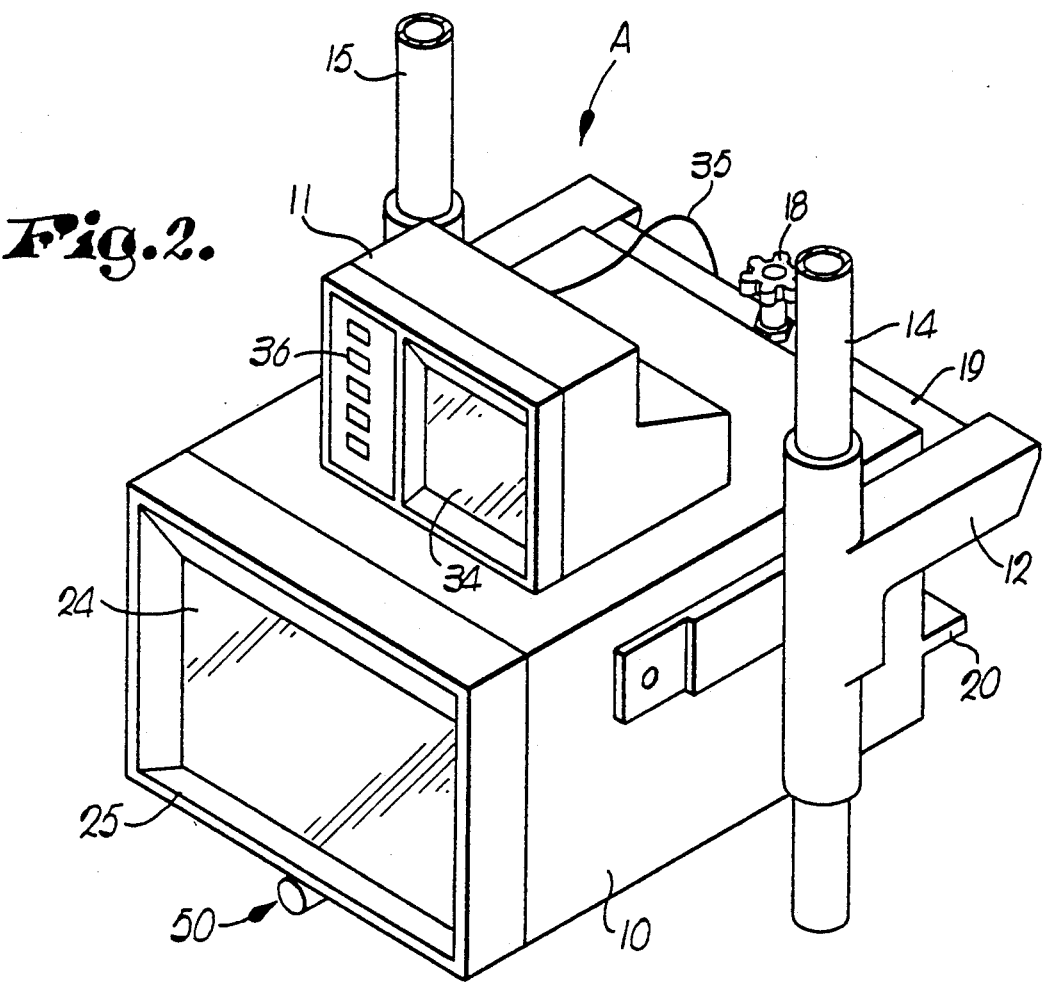
FIG. 2 is a close-up perspective view of a headlamp aiming housing and a computer and CRT housing cooperatively mounted on a stand.

FIGS. 1 and 2 illustrate a perspective view of one aspect of the headlamp aiming device "A" used in conjunction with a vehicle. The headlamp aiming device preferably includes two housings 10 and 11, commonly mounted on a support bracket 12. Support bracket 12 is slidingly received on two generally vertical posts 14 and 15. Posts 14 and 15 extend upwardly from a base 16. The base 16 can move transverse to the orientation of posts 14 and 15 on a track 17, such as shown and described in Irwin, U.S. Pat. No. 3,515,483, and Hopkins, U.S. Pat. No. 4,948,249.

The support bracket 12 can also include means for adjusting the attitude of the housing 10 along at least one axis. Such means is described in detail in co-pending application No. 07/964,599, entitled "Headlamp Aiming Method Using Pattern Framing", filed Oct. 21, 1992, and generally comprises a knob 18 which extends through a flange 19 in support bracket 12 and through a flange 20 attached to the rear of housing 10 and extending outwardly therefrom.

Although FIGS. 1 and 2 show by way of example a headlamp aiming device mounted on a pair of posts for aiming a single headlamp, it is to be recognized that the headlamp aiming device can be mounted on a single support beam extending across the front of the vehicle. In this case, a second headlamp aiming device can be mounted on the support arm at an appropriate location to simultaneously aim the other headlamp. Such a structure would more likely be used in a manufacturing facility than the single unit illustrated herein, which is more appropriately designed for a service station or repair facility. Further, such a multiple-device structure can include servo-motors which could automatically move the headlamp aiming devices along vertical or horizontal axes in response to commands from a computer. The single-device structure illustrated herein would most likely require manual adjustment of the vertical and horizontal location of the housings on the headlamp aiming device. However, the principles of the present invention are applicable to both the multi-device structure and the single-device structure illustrated herein. Moreover, the present invention is applicable to any type of headlamp aiming device which requires that a predetermined location (e.g., the centerpoint) on the headlamp be known so that the headlight aiming device can be properly located prior to using an aiming process.

The particular structure and electronic circuitry for the headlight aiming device are also illustrative in nature. For example, referring now to FIG. 3, the housing 10 for the aiming device can include a lens 24 at its front, open end 25 for focusing a light beam of a vehicle headlamp 26 within housing 10. The lens 24 is preferably a converging lens that focuses a beam of light from a vehicle headlamp 26 onto a surface or screen 28 mounted within housing 10 opposite lens 24.

The image formed on screen 28 is sensed by an image sensor 30, for example a charged coupled device (CCD) integrated circuit (IC) such as commercially available from Texas Instruments, Model No. TC211, that is located within housing 10. Image sensor 30 includes a relatively large number of photosensitive cells arranged in a matrix. The matrix of cells permits the intensity of the light beam to be measured across the width of the beam.

An image sensor such as the TC211 unit senses the intensity of a light beam incident on the IC and stores that information as picture elements (i.e., pixels). The picture elements include information relative to the proportion of light incident in every cell in the matrix of cells. The cells can be interrogated in a sequential fashion and can provide light intensity values in an analog format which may then be digitized.

The image sensor 30 is mounted on housing 10 and is electrically connected to circuit board 32. Circuit board 32 provides aim data and beam images through monitor and power port 33 to a CRT display 34 in a housing 11 via a multiple conductor cable 35. Adjacent CRT display 34 in housing 11 is a keyboard 36 which permits an operator to control the functioning of the apparatus, so that the headlamps can be appropriately aimed and intensity patterns displayed. Indicia on the individual keys of keyboard 36 can be replicated on CRT display 34.

Calibration of the headlamp aiming system is provided through calibrate port 37. Software updates can be provided through expansion port 38. The electronic controls for the headlamp aiming apparatus are also incorporated onto the circuit board 32 and include a microprocessor; memory (RAM) for storing light intensity information; memory (EEROM) for storing calibration parameters; and memory (ROM/EPROM) for storing computer programs for operation of the headlamp aiming device, such as shown and described in co-pending application No. 07/964,599. The particular electrical components of the aiming device are also merely illustrative in nature.

As indicated previously, it is important to center the headlamp 26 relative to lens 24, or to a focusing aperture if no lens is used, to form the proper image for headlamp aiming and intensity pattern measurements. Lens 24 is positioned opposite headlamp 26 by vertically or horizontally adjusting housing 10 as necessary and by moving base 16 either manually or with the use of computer-controlled servo-motors (not shown).

Figure 3:
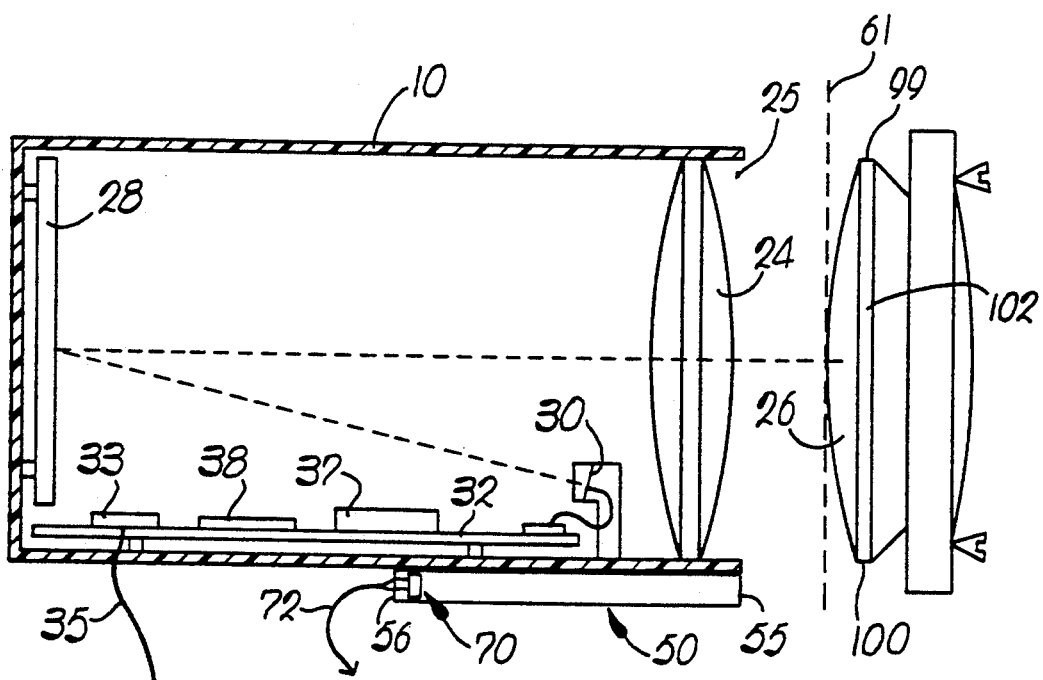
FIG. 3 is a side view, partially in section, of a portion of an apparatus according to the present invention.

To this end, as shown most clearly in FIGS. 2–4, centering may be achieved with the use of a light detection device, indicated generally at 50. As will be discussed herein in more detail, the light detection device is moved from a position outside of the headlamp light beam to a position within the headlight light beam and across the plane of the headlamp edge. By calculating the change in light intensity as the light detection device crosses the plane of the headlamp edge, the location of the headlamp edge can be accurately and consistently determined.

According to one aspect of the present invention, the light detection device 50 includes an enclosure, e.g., a tubular housing 52, formed from appropriate, relatively inexpensive material (e.g., aluminum or plastic), with a coating on the inner surface 53 of non-reflecting material, e.g., flat black paint. The tube has a central bore 54 extending from an entrance opening at one end 55 to a rear opening at the other end 56 of the tube. A counterbore 57 is formed at the end 56 of the tube.

The light detecting device 50 is mounted for movement relative to the headlamp 26, for example on the bottom of housing 10 using appropriate fasteners. It is preferred that the light detection device 50 is mounted to the housing 10 such that the central axis 60 of the tube extends substantially perpendicular to the plane 61 of the headlamp lens 25. When the light detection device 50 is located in front of the headlamp in this manner, the light beam from an illuminated headlamp enters the entrance opening in tube end 54 and travels down the tube 52 toward the rear tube end 56. A lens 69 can be mounted proximate front tube end 55. Lens 69 can be a converging lens which focuses the light beam down the tube 52.

A light detector, indicated generally at 70, is located at the rear end 56 of the light detection device 50, and preferably within the section of the tube defined by counterbore 57. The light detector 70 includes a photoreceptive device 71, such as a photodiode or photovoltaic cell, which provides an output voltage signal along shielded conductors 72 a,b indicative of the intensity of light on the front surface 74 of the device 71.

A preferred photoreceptive device 71 for the present invention is a blue sensitive photodiode marketed by the Sharpe Corporation under the mark/designation BS100C, however other photodiodes could be used with the present invention. Such a photodiode as the Sharpe BS100C has an infrared light cut-off filter (not shown) on the front surface 74, and a pair of posts 76, 77 extending outwardly from the detector 71. The posts are connected (e.g., soldered) to the conductors 72 a, b, respectively, with the cathode post 76 of the photodiode connected to conductor 72a, and the anode post 77 of the diode connected to conductor 72b.

As illustrated in FIG. 4, the light detector 70 can be mounted within the far end 56 of the tube and appropriate adhesive, e.g., contact cement 79, can anchor the detector within the tube. Further, a retaining ring 80 having substantially the same dimensions as the inner diameter of the tube, can be located within the end of the tube to further locate and retain the light detector 70 within the tube. After the detector 70 and retaining ring 80 are located within the end of the tube, the end of the tube can be filled with appropriate insulating compound 81.

The length of the tube and inside diameter of the tube between the entrance opening and the light detector are chosen such that an appropriate amount of light, when incident at the entrance opening 54 of the tube, travels down the tube and is incident upon the outer surface 74 of the light detector 70. In particular, the length and diameter of the tube for the light detector are chosen to provide a field of view sufficient to result in a voltage output from the light detector versus position change that can be used to determine headlamp position within an acceptable tolerance. Further, the distance from the headlamp to the light detector also determines the length of tube; while the inside diameter of the tube, and in particular the inside diameter of the counterbore 57 of the tube, is also chosen to provide a means to easily mount the photoreceptive device.

For the Sharpe BS100C photodetector, the relative dimensions of the tube are preferably as follows:
Tube length = 12.250 inches
Outside tube diameter = 0.250 inches
Inside tube diameter = 0.180 inches
Inside tube diameter (counterbore) = 0.234 inches
Length of counterbore = 0.250 inches
However, the above dimensions are only approximates and can change depending upon the particular applications.

The rate of change of voltage from the light detector with respect to position increases as the light detection device approaches the headlamp edge, then levels off just after passing through the headlamp edge plane. The point that the voltage levels off, and how fast it levels off, determines how accurately the headlamp edge position can be determined. Accordingly, the length and diameter of the tube are chosen such that the headlamp edge can be accurately and consistently determined using the resulting field of view. Further, the focusing lens 69 in front of the light detector 70 can also enhance the rate of voltage versus position change by focusing the light beam at the detector in the tube.

Further, according to another aspect of the present invention, the same effect, i.e., control of the field of view, can also be accomplished by using a pin hole opening (not shown), such as found in a camera shutter, in front of a photodiode or other type of light detector. The photodiode could be mounted within an enclosure in a similar fashion as described above.

Still further, according to yet another aspect of the present invention, the light detection device can comprise an optical fiber (not shown) with a lens to focus the light beam at the front end of the optical fiber. The fiber could be used with a photodiode or other light detector mounted on the rear end of the fiber, and can be mounted in a similar fashion as described above.

According to any of the aspects described above, the output voltage signal along conductors 72 a,b from the light detector 70 is applied to a signal amplifying circuit, indicated generally at 84 in FIG. 5. The signal amplifying circuit 84 linearly amplifies the photodiode analog output to a level sufficient to convert the analog signal to a digitally coded signal that can be recognized by a software routine incident in the computer in housing 10.

The electrical circuitry 84 includes a 5 volt power supply 86 connected to both the collector of transistor 88 and the cathode of photoreceptive device 71 via conductor 72a. A resistor 92 is electrically connected between the base of the transistor 88 and the anode of the photodiode 71 via conductor 72b. The output from the transistor emitter is applied to an analog-to-digital convertor 93 which converts the analog signal to a digital signal and supplies the signal to a microprocessor 94 in the computer. The transistor emitter is also connected through resistor 98 to ground.

The method for centering the light detecting device in front of the headlamp will now be briefly described. Initially, the aiming device "A" is powered up and calibrated as necessary. The aiming device "A" is then brought in front of the headlamp such that the lens 24 of the aiming device is proximate the headlamp 26. The light detection device 50 is then moved out of the illumination pattern of the headlamp, for example, by moving the aiming device vertically upward until the output from the light detection device indicates that it is a sufficient distance outside the beam pattern.

The aiming device, and hence the light detection device 50, is then moved vertically downward, and measurements of the light intensity in the light detection device 50 are taken at appropriate intervals as the light detection device 50 approaches the top edge 94 of the headlamp 26.

As described previously, the beam pattern from the illuminated headlamp is directed through the entrance opening 54, down the length of the tube 52, and is incident upon the light detector 70 within the tube. As the light detector tube moves past the top edge 99 of the headlamp, the amount of light present from the headlamp is significantly increased due to the focusing effect of the headlamp flutes, as compared to a location immediately above the top edge 99 of the headlamp. The rate of light intensity change is greatest in the vicinity of the headlamp top edge horizontal plane. Since the light detector 70 output voltage is proportional to the level of light intensity received at the surface of the photoreceptive device, by maneuvering the light detection device in the vicinity of the powered headlamp top edge 99, the change in light detector device voltage with respect to the change in position can be used to determine the exact location of the top edge of the headlamp.

Once the location of the top edge of the headlamp is determined, the location of the top edge can be compared with the manufacturer's specifications for the particular headlamp using software resident in the computer, and consequently a horizontal center line, or other specific horizontal location of the headlamp, can be calculated. It should be appreciated that the bottom edge 100 of the headlamp could just as well be used to find the horizontal centerline of the headlamp.

By using the same technique in a horizontal (left-to-right or right-to-left) direction, the left side edge 101 or right side edge 102 of the headlamp can also be determined by sensing the rapid change in intensity as the light detection tube crosses either side edge of the headlamp. With this information and manufacturer's specification, the centerpoint of the headlamp, or other particular location on the headlamp, can be accurately determined.

Alternatively, both the top and bottom edges and the left and right side edges can be determined, and the centerpoint (or other appropriate point on the headlamp) can be determined directly from these values by, e.g., calculating the midpoint between the top and bottom edges, and between the left and right side edges.

Once the particular point on the headlamp is determined, the computer can display the necessary vertical and horizontal correction for the headlamp aiming device such that the lens 24 of the aiming device is accurately centered or otherwise located for a particular headlamp. Alternatively or additionally, this output can be fed to appropriate servo-motors (not shown) which will automatically move the aiming device vertically and/or horizontally to the appropriate location in front of the headlamp.

Accordingly, as discussed above, a novel and unique way has been provided to accurately center a headlamp aiming device in front of a headlamp. The device is simple to use and provides accurate, repeatable results using apparatus which is relatively inexpensive.

The invention has been described with respect to certain embodiments. Modifications and additions within the spirit of the invention will occur to those skilled in the art. For example, it is would be possible to obtain the same centering results with the light detection device mounted at another location on the aiming device, for example along the top or side of the aiming device. Accordingly, the scope of the invention is limited solely by the following claims.

What is claimed is:

1. An apparatus for centering an aiming device with respect to a vehicle headlamp, wherein the aiming device is designed to sense the light intensity across a light beam from the headlamp, compare the light intensity to prescribed standards, and provide an adjustment output which can be used to adjust the headlamp, said centering apparatus comprising:
   a hollow enclosure mounted to the aiming device, said hollow enclosure having first and second ends, said first end of said enclosure having an entrance opening designed to have light from an illuminated headlamp incident thereon,
   a light detector located at the second end of the enclosure which is designed to receive light traveling through the entrance opening of the enclosure and down the length of the enclosure and provide first output signal indicative of the intensity of light in the enclosure, said enclosure having an inner diameter and a length between said entrance opening and the light detector such that the entrance opening of the enclosure provides a field of view sufficient to result in when first output signal changing with respect to various enclosure positions as the enclosure is moved across the beam pattern of the headlamp to indicate a particular headlamp position within an acceptable tolerance,
   signal amplifying circuitry connected to said light detector for receiving the first output signal, amplifying the signal, and providing an amplified first output signal, and
   computation means for receiving the amplified first output signal, determining the location of an edge of the headlamp when the enclosure is moved across the plane of the headlamp edge from the rapid change in light intensity level, and providing a second output signal which is indicative of the distance between the enclosure and a predetermined location on the headlamp.

2. An apparatus as in claim 1, wherein said enclosure comprises a tubular housing having first and second ends.

3. An apparatus as in claim 2, wherein said centering apparatus is mounted to the aiming device at a location such that the central axis of the tubular housing is substantially perpendicular to the plane of the headlamp lens when the aiming device is located in front of the headlamp.

4. An apparatus as in claim 3, wherein said light detector includes a photodiode mounted within the second end of the tubular housing.

5. An apparatus as in claim 4, wherein said tubular housing has a length of about 12.25 inches and a diameter of approximately 0.18 inches.

6. An apparatus for aiming a vehicle headlamp, comprising:
   an aiming device for sensing the light intensity across a light beam for the headlamp, comparing the light intensity to prescribed standards, and providing an adjustment output which can be used to adjust a headlamp, and
   a centering device for locating said aiming device with respect to a predetermined location on the headlamp, said centering device comprising:
   a hollow enclosure mounted to the aiming device, said hollow enclosure having first and second ends said first end of said enclosure having an entrance opening designed to have light from an illuminated headlamp incident thereon,
   a light detector located at the second end of the enclosure which is designed to receive light traveling through the entrance opening of the enclosure and down the length of the enclosure and provide first output signal indicative of the intensity of light in the enclosure, said enclosure having an inner diameter and a length between said entrance opening and the light detector such that the entrance opening of the enclosure provides a field of view sufficient to result in said first output signal changing with respect to various enclosure positions as the enclosure is moved across the beam pattern of the headlamp to indicate a particular headlamp position within an acceptable tolerance,
   signal amplifying circuitry connected to said light detector for receiving the first output signal, amplifying the first output signal, and providing an amplified first output signal,
   computation means for receiving the amplified first output signal, determining the location of an edge of the headlamp when the enclosure is moved across the plane of the headlamp edge from the rapid change in light intensity level, and providing a second output signal which is indicative of the distance between the enclosure and a predetermined location on the headlamp.

7. An apparatus as in claim 6, wherein said enclosure comprises a tubular housing having first and second ends.

8. An apparatus as in claim 7, wherein said centering apparatus is mounted to the aiming device at a location such that the central axis of the tubular housing is substantially perpendicular to the plane of the headlamp lens when the aiming device is located in front of the headlamp.

9. An apparatus as in claim 8, wherein said light detector includes a photodiode mounted within the second end of the tubular housing.

10. An apparatus as in claim 9, wherein said tubular has a length of about 12.25 inches and a diameter of approximately 0.18 inches.

11. A method for locating a predetermined location on a vehicle headlamp, comprising the steps of:

illuminating the headlamp to be tested, said illuminated headlamp providing a beam pattern through a lens on the headlamp, locating an elongated hollow enclosure outside of the beam pattern of the illuminated headlamp, said enclosure having an entrance opening at one end directed toward the headlamp, and a detection device at the other end, said hollow enclosure having a central axis and being located such that said central axis of the enclosure is generally perpendicular to the lens of the headlamp, passing the enclosure through the beam pattern of the headlamp along at least one axis of the headlamp with the central axis of the enclosure generally perpendicular to the surface of the lens such that the enclosure passes across the plane of the edge of the headlamp and the headlamp light beam passes down through the enclosure and is incident on the detection device, detecting with the detection device the intensity level of the light beam within the enclosure as the enclosure is moved through the beam pattern and across the plane of the edge of the headlamp, calculating the location of the edge of the headlamp from the detected light beam intensity level, calculating the predetermined location on the headlamp from the location information regarding the edge of the headlamp and manufacturer's specifications regarding the dimensions of the headlamp.

12. A method as in claim 11, wherein the enclosure is moved both horizontally and vertically through the headlamp beam to calculate the location of the side and top edges, respectively, of the headlamp.

13. A method as in claim 12, further including the step of focusing the light from the headlamp at the detection device with a lens located in the enclosure.

14. A method as in claim 13, wherein said enclosure has a tubular housing.

15. A method for centering an aiming device with respect to a vehicle headlamp, comprising the steps of:
illuminating the headlamp to be tested, said illuminated headlamp providing a beam pattern through a lens on the headlamp, locating the aiming device generally in front of the headlamp, said aiming device having an elongated hollow enclosure mounted thereto, locating the elongated hollow enclosure outside of the beam pattern of the illuminated headlamp, said enclosure having an entrance opening at one end directed toward the headlamp, and a detection device at the other end, said hollow enclosure having a central axis and being located such that said central axis of the enclosure is generally perpendicular to the lens of the headlamp, passing the enclosure through the beam pattern of the headlamp along at least two axes of the headlamp with the central axis of the enclosure generally perpendicular to the surface of the lens such that the enclosure passes across the plane of at least two edges of the headlamp and the headlamp light beam passes down through the enclosure and is incident on the detection device, detecting with the detection device the intensity level of the light beam within the enclosure as the enclosure is moved through the beam pattern and across the plane of the edges of the headlamp, calculating the location of the edges of the headlamp from the detected light beam intensity levels, calculating the predetermined location on the headlamp from the location information regarding the edges of the headlamp, and adjusting the location of the aiming device such that the aiming device is located at a predetermined location in front of the headlamp corresponding to the predetermined location on the headlamp.

16. A method as in claim 15, wherein the enclosure is moved both horizontally and vertically through the headlamp beam to calculate the location of the side and top edges, respectively, of the headlamp.

17. A method as in claim 16, wherein the enclosure is tubular.

18. A method as in claim 17, further including the step of focusing the light from the headlamp at the detection device with a lens located in the enclosure.

19. A method as in claim 15, wherein the predetermined location on the headlamp is calculated from the location information regarding the edges of the headlamp and manufacturer's specifications regarding the dimensions of the headlamp.

20. A method as in claim 15, wherein the predetermined location on the headlamp is calculated from the location information regarding the edges of the headlamp by determining the midpoint between the top and bottom edges of the headlamp and the left and right side edges of the headlamp.

* * * * *